US011153082B2

(12) United States Patent
Fox et al.

(10) Patent No.: US 11,153,082 B2
(45) Date of Patent: Oct. 19, 2021

(54) ROLLING BIOMETRIC KEY EXCHANGE (71) Applicant: Capital One Services, LLC, McLean, VA (US)

(72) Inventors: Ryan Fox, Lebanon, OH (US); Keith Hamburg, Reston, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 84 days.

(21) Appl. No.: 16/585,650

(22) Filed: Sep. 27, 2019

(65) Prior Publication Data
US 2020/0145207 A1 May 7, 2020

Related U.S. Application Data (63) Continuation of application No. 16/183,410, filed on Nov. 7, 2018, now Pat. No. 10,469,259.

(51) Int. Cl.
*H04L 9/08* (2006.01)
*H04L 9/32* (2006.01)
*H04L 29/06* (2006.01)
*G06F 21/32* (2013.01)
*H04L 9/06* (2006.01)

(52) U.S. Cl.
CPC .......... *H04L 9/0866* (2013.01); *H04L 9/0643* (2013.01); *H04L 9/0894* (2013.01); *H04L 9/3231* (2013.01); *H04L 9/3242* (2013.01); *H04L 63/0861* (2013.01); *G06F 21/32* (2013.01)

(58) Field of Classification Search
CPC ... H04L 9/0866; H04L 9/0643; H04L 9/0894; H04L 9/3231; H04L 9/3226; H04L 9/3242; H04L 63/083; H04L 63/0861; G06F 21/32
See application file for complete search history.

(56) References Cited

U.S. PATENT DOCUMENTS

| 5,666,415 | A  | * | 9/1997 | Kaufman | H04L 9/3226 380/28 |
| 9,031,231 | B2 | * | 5/2015 | Asim | G06F 21/606 380/44 |
| 2009/0310830 | A1 | | 12/2009 | Bolle et al. | |
| 2013/0227139 | A1 | * | 8/2013 | Suffling | H04L 9/3226 709/225 |

(Continued)

OTHER PUBLICATIONS

International Search Report and Written Opinion for International Application No. PCT/US2019/060237 dated Mar. 9, 2020, 15 pages.

*Primary Examiner* — Daniel B Potratz
(74) *Attorney, Agent, or Firm* — Kacvinsky Daisak Bluni PLLC (57) ABSTRACT

Various embodiments are generally directed to techniques of generating a unique biometric key, hashing and salting the key, and storing it. Embodiments include techniques to analyze biological information associated with a user and determine one or more biological characteristics from the analyzed information. The biological characteristics may be used to generate a character string unique to the user, which may be used to generate the biometric key based on a cryptographic algorithm. The hash values, salt values, or the hash function may be changed at a predetermined interval.

20 Claims, 8 Drawing Sheets

(56) References Cited

U.S. PATENT DOCUMENTS

| | | | |
|---|---|---|---|
| 2016/0125416 A1* | 5/2016 | Spencer | G06F 21/73 |
| | | | 705/71 |
| 2016/0306954 A1 | 10/2016 | Hawkins | |
| 2017/0005794 A1* | 1/2017 | Paddon | H04L 9/3231 |
| 2017/0085562 A1* | 3/2017 | Schultz | H04L 63/0861 |
| 2017/0177847 A1* | 6/2017 | Shi | G06K 9/00013 |
| 2018/0373885 A1* | 12/2018 | Arad | G06F 21/629 |

* cited by examiner

789&8**_ _ 0DBbuvr89!@_ _ 655578 $tyR&

AbC%I74yR743*555et56@@_**_yYYRp&&

FIG. 3A hyppRrs784++b969652^^_ _6&#!651333&%_

+7645urTTs&3% _ _   45pl7rT70909

ROLLING BIOMETRIC KEY EXCHANGE

RELATED APPLICATIONS

This application is a continuation of U.S. patent application Ser. No. 16/183,410, titled "ROLLING BIOMETRIC KEY EXCHANGE" filed on Nov. 7, 2018. The contents of the aforementioned application are incorporated herein by reference.

BACKGROUND

Typically, biometric data may be stored in an encrypted format to safeguard it against any manipulation or unauthorized theft or tampering. Although it may be encrypted, biometric data is often, if not always, stored statically. Thus, unauthorized persons may be able to copy the biometric data and replay it to access internal accounts or systems.

Accordingly, there is a need to improve the way biometric data is stored so that it cannot, or at least extremely difficult to, be replayed by unauthorized persons to access internal accounts or systems.

DETAILED DESCRIPTION

Various embodiments are generally directed to storing biometric data in a highly secure manner. Biological information and associated biological characteristics of a user may be analyzed to generate a character string that is unique to that user. A cryptographic algorithm may be applied to the generated character string to further generate a unique biometric key. The biometric key may then be hashed via a hash function and/or "salted" with additional data related to the user. The hashed and/or salted biometric key may then be stored in one or more storage devices, where the hash values (or the hash function itself) and the salt values may be changed or "rolled" at a predetermined interval, e.g., time, event, instance, etc.

In embodiments, the biological information to be analyzed may be automatically accessed or may be provided by the user. It may be understood that the term "user" herein is defined broadly and may include any persons, individuals, applicants, clients, etc. The biological information may be any information related to various anatomical or physiological features of the user. In that regard, the biological information is uniquely associated with the user providing it. For example, it may be an image of the user's face, a scan of the user's fingerprint, a scan of the user's eye, a scan of the user's hand, hand geometry, a scan of the user's palm and palm veins, and/or a recording of the user's voice. The analysis of the biological information may involve analyzing different characteristics found therein.

According to embodiments, one or more biological characteristics may be derived from the biological information. For example, when the biological information is a facial image, the biological characteristics of the face may include at least a distance between the eyes (e.g., pupillary distance), a face height, a face width, or any distance between or distances among an eye, an ear, a nose, an upper lip, a lower lip, a chin, etc. In another example, when the biological information is an eye scan, the biological characteristics of the eye may include a size of the iris and/or a pupil, a distance between veins of the retina, etc. In yet another example, when the biological information is a fingerprint, the biological characteristics may include arches, loops, and/or whorls. In a further example, when the biological information is a voice recording, the biological characteristics of the voice may include one or more unique voice or speech patterns. In yet another example, when the biological information is a palm scan, the characteristics may include ridges and lines of the palm, size and/or length of palm veins, and distances between the veins.

Since the biological characteristics of the associated biological information is unique to the user, a unique character string (e.g., an alphanumeric string) may be generated based on those characteristics. Thereafter, the character string may be applied to, or used as input in, a cryptographic algorithm to generate a biometric key. In embodiments, the biometric key is hashed using a hash function and/or "salted" using various salt data or salt values. It may be understood that "salt" or "salting" relates to adding or hashing additional data, which may be uniquely associated with the user, as input to increase overall complexity and security to, for example, defend against dictionary attacks or pre-computed rainbow table attacks. The hashed and/or salted biometric key may then be stored in one or more storage devices, where the hash values, hash functions, and/or the salt values and data are changed or rolled at a predetermined time.

In previous solutions, one problem of storing biometric data in storage devices is that it is static. The data is thus unchanged, which means that an unauthorized person can copy the data and replay the data to access secure, internal systems. Another problem of storing biometric data is that while a user's biological information is typically encrypted when stored, the biological information is directly used to generate root keys (or building other keys with the root keys) for accessing the internal systems. The above-described embodiments and examples described herein overcome the above problems and are advantageous over the previous solutions in numerous ways. For example, the biological information may be used to generate a character string unique to the user, which is, in turn, applied to a cryptographic algorithm and used to generate the biometric key. Thus, the biological information itself and/or the character string are not required to be stored in any storage devices, thereby improving overall security. Moreover, the hash function(s), hash values, and salt values applied to the biometric key may be constantly changed at different times or intervals, thereby rendering the comprised biometric keys in internal systems useless at later times.

Reference is now made to the drawings, where like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

Figure 1A:
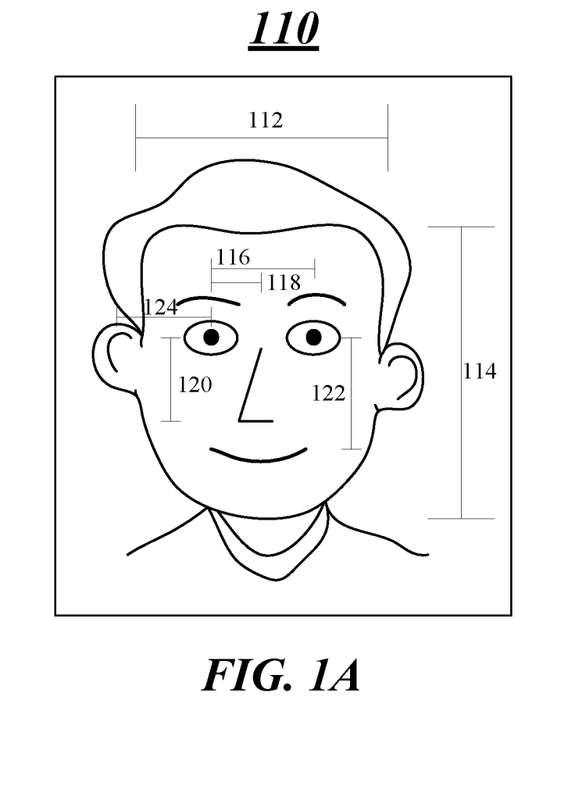
FIG. 1A illustrates a first example biological information in accordance with one or more embodiments.

FIG. 1A illustrates an example biological information of a user, e.g., a facial image 110. By way of example, image 110 is a close-up, headshot of the user and it may be a digital image captured by at least one input device, such as a camera. In other examples involving other types of biological information, the input device may be a fingerprint reader, a palm print scanner or reader, a palm vein scanner or reader, etc. It may be understood that the image of the user is not limited to a close-up headshot, but may any suitable image, e.g., profile image, group shot, etc., in which the face of the user is visible and analyzable.

The analysis may be performed on the image 110 by one or more computing devices or by processing circuitry thereof (the features of which will be further described below) to determine one or more biological characteristics of the user. As shown, the user's face may exhibit numerous biological characteristics. For example, the face has a face width 112, a face height, 114, a distance from one pupil of one eye to the other pupil of the other eye, e.g., pupillary distance (PD) 116, a monocular PD 118, a vertical distance 120 between a pupil and bottom of the nose, a vertical distance 122 between a pupil and the lips, and a horizontal distance 124 between a pupil and an ear.

It may be understood that the face may exhibit many more characteristics, such as the distance between ear to ear, the distance between one part of the face to an upper lip or lower lip, length of neck, etc. It may also be understood that different types of pictures may exhibit different characteristics, for example, a profile image may reveal eye socket depth and the like. To that end, the biological characteristics, collectively, may be unique to the user depicted in the image 110. And based on these characteristics, a character string that is unique to the user may be generated.

Figure 1B:
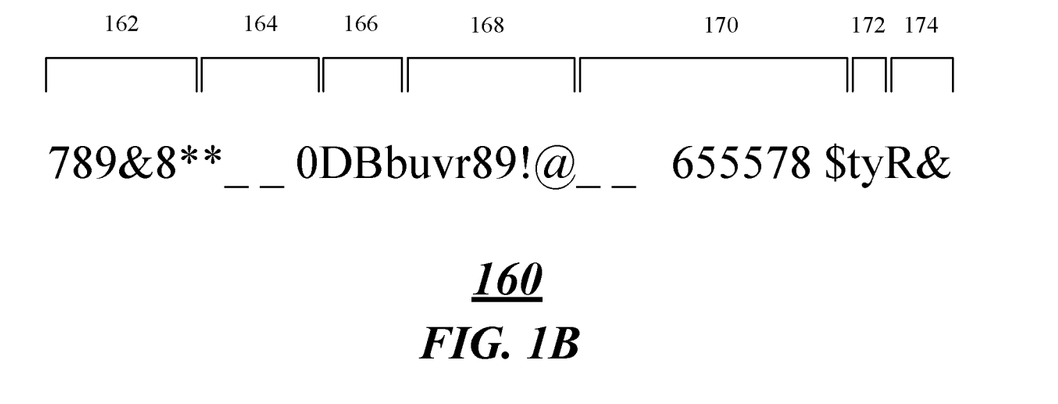
FIG. 1B illustrates a first example character string in accordance with one or more embodiments.

FIG. 1B illustrates an example character string 160 that may be generated by a computing device or processing circuitry thereof based on the biological characteristics. As shown, the character string 160 is a series of alphanumeric characters and may include at least seven different segments 162, 164, 168, 170, 172, 174, where each segment can correspond to a biological characteristic of the user. For example, segment 162, which includes characters 789&8*, may represent at least the exact numerical measurement of the face width 112 of the user. For instance, 789&8* may represent 15.2 centimeters. Different characters and combinations thereof may be used to represent the measurement in different measurement units, e.g., inches, centimeters, etc. The characters in segment 162 may also define more than just a measurement and may define the gender associated with the measurement or the like. The specific characters and the arrangement of those characters in segment 162 may be predefined, predetermined, and/or may be based on a coding technique or system, as will be further discussed below.

As further shown in FIG. 1B, segment 164 includes characters *_ _0 and may represent at least the measurement of the face height 114 of the user. Segment 166 is shorter than segment 164 and has characters DBb, which may represent at least the measurement of the monocular PD 118. Segment 168 includes characters uvr89!@ and may represent at least the measurement of the PD 116. Segment 170 is longest in length and has characters _ _655578$, which may represent the vertical distance 122 between the left pupil and the lips. As shown, portions of the segment 170 may be delimited or defined by spaces, for example, two spaces between the underscore and the number 6 and a space between the number 8 and the $ symbol. These spaces—the delimitation and use of these spaces—may represent some informational aspect of the vertical distance 122, e.g., measurement unit, gender, color of eye, etc. Similarly, other characters, such as the underscore, may be used to delimit or define parts of the character string. Segment 172 includes characters ty and may represent at least the vertical distance 120 between the pupil and bottom of the nose. And segment 174 includes characters R& and may represent at least the horizontal distance 124 between the pupil and the ear.

It may be understood that the combination of the various segments of the character string may collectively and uniquely define the biological characteristics of the user. In that regard, the segments may vary in length, vary in the types of characters used, vary in how spaces and/or characters are layered, infused, or delimited, how the segments themselves are arranged, etc.

Selection of the types of characters or symbols in the character string, the arrangement, how they are spaced, etc. may be based on one or more coding techniques, systems, and/or algorithms. For example, it may be monoalphabetic ciphers (e.g., caesar, atbash, keyword, pigpen, masonic, Polybius), polyalphabetic ciphers (e.g., vigenere, beaufort, autokey, running key), polygraphic ciphers (e.g., playfair, bifid, trifid, four-square), transposition ciphers (e.g., rail fence, route, columnar transposition), and other suitable types of ciphers, codes, algorithms (e.g., book cipher, beale cipher, morse code, tap code, one-time pad, scytale, semaphore, ASCII, steganography). The coding may be built on custom-built tables, which may be rolled or changed periodically. Moreover, it may be understood that the coding may integrate or employ one (or combinations) of any technique above.

Figure 2A:
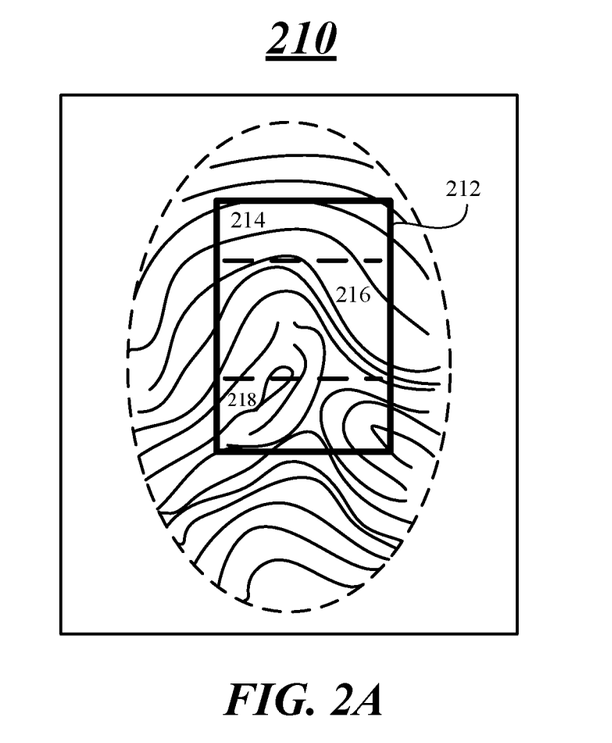
FIG. 2A illustrates a second example biological information in accordance with one or more embodiments.

FIG. 2A illustrates another example of biological information of a user, e.g., fingerprint 210, which may be a fingerprint of the user's thumb. The fingerprint 210 may be captured via a fingerprint scanner, ink and paper, or any suitable way of imaging a fingerprint by a computing device. In some instances, the fingerprint 210 may be captured via ink and paper and converted to a digital fingerprint by a camera, a scanning device, and the like, for example. The fingerprint 210 may include various and numerous loops, whorls, and/or arches unique to the user.

The analysis may be performed on the fingerprint 210 to determine one or more biological characteristics of the user. As shown in FIG. 2A, for example, a portion 212 (illustrated by a box) of the fingerprint 210 may be analyzed. A first level of analysis may include determining how many loops, whorls, or arches are present in the portion 212. A second level of analysis may be examining the specific characteristics of the loops, whorls, or arches, or portions thereof, in separate sub-portions 214, 216, and 218 of the portion 212.

The number of arches and/or distances between each arch in sub-portion 214, for example, may be determined. The same for loops and whorls in sub-portion 214, as well as the number of arches, loops, or whorls and/or the distances between the same in sub-portions 216 and 218 may be determined. Moreover, the unique and specific patterns and shapes of the loops, whorls, or arches in each of the sub-portions may be analyzed and determined. Upon determining and acquiring data associated with the biological characteristics of the fingerprint 210 from the at least first and second analysis, a character string that is unique to the user's fingerprint 210 may be generated.

Figure 2B:
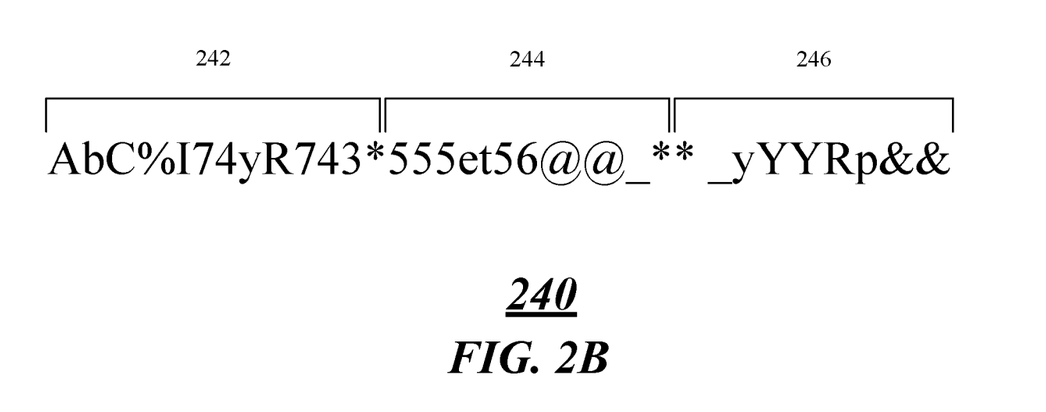
FIG. 2B illustrates a second example character string in accordance with one or more embodiments.

FIG. 2B illustrates another example character string 240 generated by a computing device based on a fingerprint. As shown, the character string 240 may include at least three segments 242, 244, 246, each segment corresponding to the analysis performed on a respective sub-portion of fingerprint 210. For example, segment 242 may correspond to sub-portion 214, segment 244 may correspond to sub-portion 216, and segment 246 may correspond to sub-portion 218. Based on the analysis of sub-portion 214, the characters of segment 242 are AbC%I74yR743*, which may indicate, for instance, the types of characteristics found in sub-portion 214 (e.g., arches, loops, whorls), the number of those characteristics, the distance between each characteristic, etc. The characters, the types of characters, and arrangement may be predetermined, predefined, or may be based on a coding technique system, as described above. As illustrated, the characters of segment 244 are 555et56@@_* and the characters of segment 246 are *_yYYRp&&. The characters may also be space or character delimited or defined in any suitable way that represents the information associated with the biological characteristics. In at least this regard, the generated character string 240 may be unique to the user.

Figure 3A:
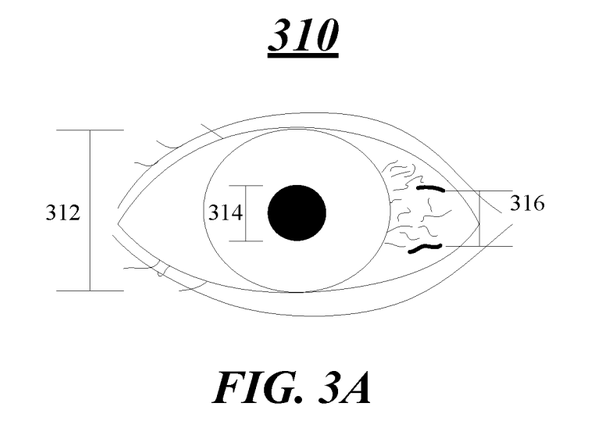
FIG. 3A illustrates a third example biological information in accordance with one or more embodiments.

FIG. 3A illustrates yet another example of the biological information of a user, e.g., eye scan 310. The eye scan 310 may be acquired via an eye scanner, a retinal scanner, or any suitable device capable of scanning or imaging a user's eye. Similar to the above examples, the analysis may be performed on the eye scan 310 and one or more biological characteristics unique to the user determined. The eye scan 310 may include biological characteristics, such as an iris size 312, a pupil size 314, and a distance 316 between two retinal veins. Other veins with varying distances may also be selected. Based on these characteristics, a character string may be generated, which, again, is unique to the user.

Figure 3B:
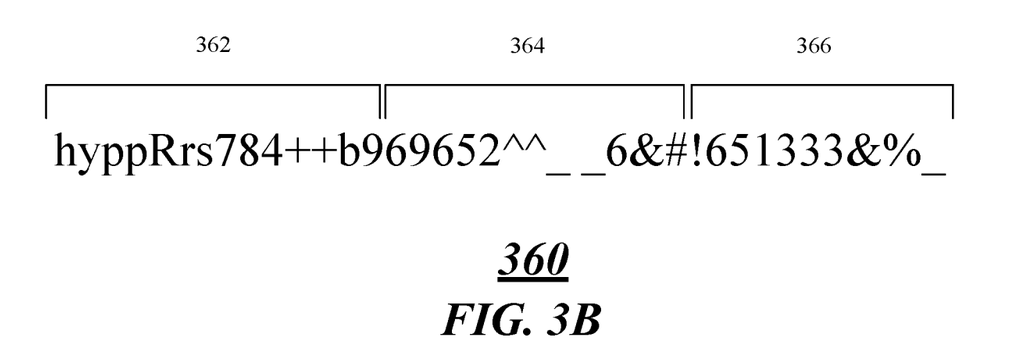
FIG. 3B illustrates a third example character string in accordance with one or more embodiments.

FIG. 3B illustrates yet another example character string 360 generated by a computing device based on an eye scan. Character string 360 has at least three segments 362, 364, and 366. Segment 362 may correspond to information regarding iris size 312 and includes characters hyp-pRrs784++b9. Segment 364 may correspond to information regarding pupil size 314 and includes characters 69652^^6&#. And segment 366 may correspond to information regarding the distance 316 between the two veins in the retina of the user's eye and includes characters !651333&%_. The characters themselves, the arrangement thereof, and the delimitation and/or use of various spaces and characters may be predetermined, predefined, or based on a coding technique or system, described above. The character string 360 is unique to the user based on the biological information provided in the user's eye.

Figure 4A:
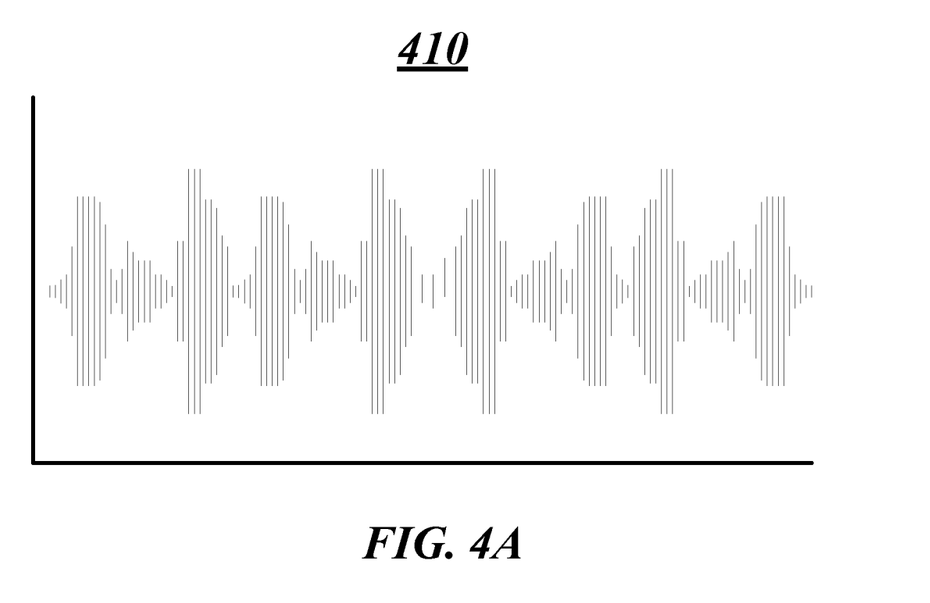
FIG. 4A illustrates a fourth example biological information in accordance with one or more embodiments.

FIG. 4A illustrates a further example of biological information of a user, e.g., voice recording 410. The voice may be recorded via a microphone, for example. The analysis may be performed on the voice recording to determine one or more unique biological characteristics. As shown, voice recording 410 may modulate at various levels over the course of the recording. Thus, the characteristics that may be derived from the analyzed voice recording 410 includes differing modulation levels, e.g., highest modulation value, lowest modulation value, and includes a distance between two adjacent modulations, the overall shape of the recording, recurring patterns in the modulations, voice frequency, pronunciations of certain words, enunciation, cadence, etc.

Figure 4B:
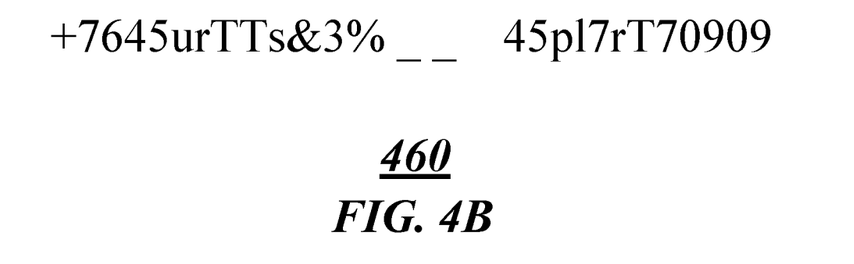
FIG. 4B illustrates a fourth character string in accordance with one or more embodiments.

FIG. 4C illustrates a further example character string 460 generated by a computing device based on a voice recording. Using the unique biological characteristics determined from the voice recording 410, character string 460 may be generated, which includes characters+ 7645urTTs&3%__45p17rT70909. As set forth above, the characters and the arrangement of those characters may be based on a coding technique or system or any other suitable predetermined or predefined technique. The characters and symbols may also be space or symbol delimited or defined. Like the other above described character strings, character string 460 is again unique to the user.

Figure 5:
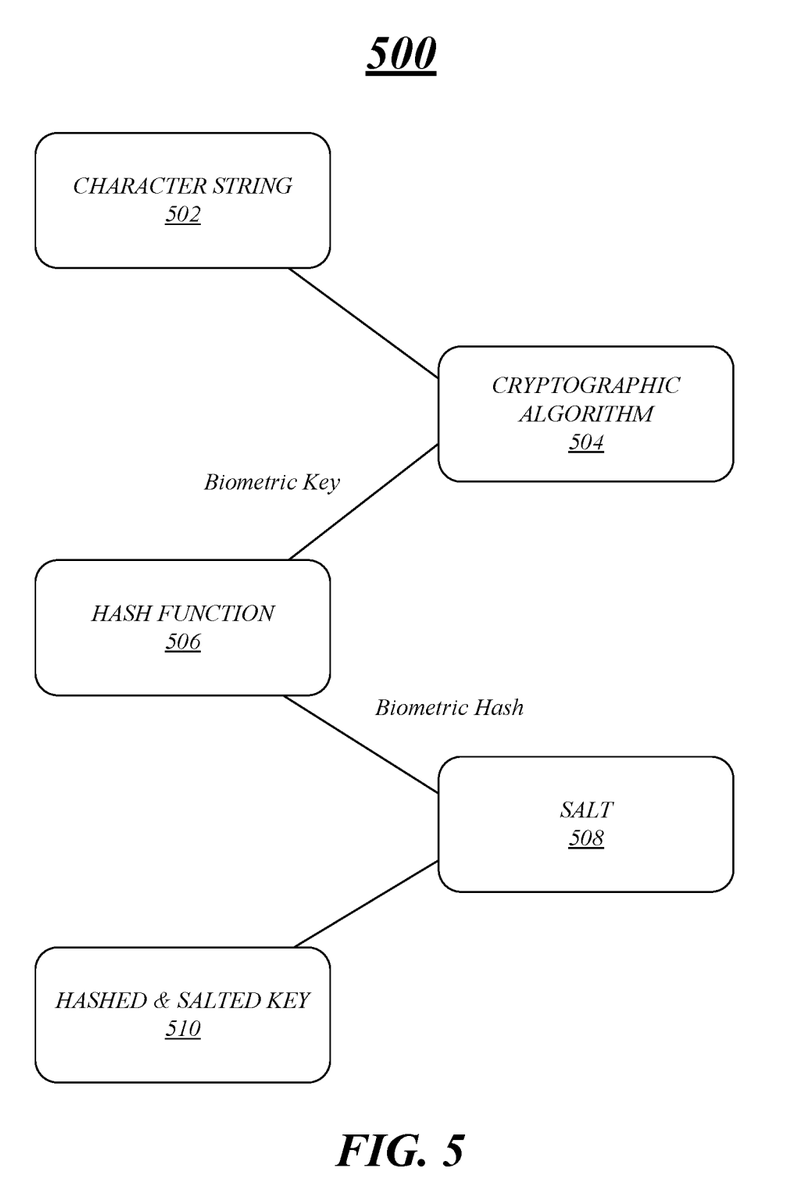
FIG. 5 illustrates an example block diagram in accordance with one or more embodiments.

FIG. 5 illustrates an example block diagram 500 according to embodiments. Upon generating a character string 502 that is based on the biological information of the user, e.g., character strings 160, 240, 360, 460, the character string may be applied to, or used in, a cryptographic algorithm 504 or an encryption algorithm to generate a biometric key unique to the user. In at least that regard, neither the biological information (including the analyzed and determined biological characteristics) nor the character string are required to be stored based on the generation of the biometric key via the cryptographic algorithm 504. It may be understood that the term biological information may be interpreted broadly, as set forth above, and may be any information, a digital image or otherwise, that contains data with respect to a user's numerous and unique anatomical or physiological characteristics, which may be encompassed by the term biological characteristic, as set forth above.

The cryptographic algorithm 504 may be any suitable algorithm for encrypting, concealing, or otherwise scrambling information. For example, it may be one (or a combination) of the following: a Triple Data Encryption Standard (DES) algorithm, (ii) a RSA public-key encryption algorithm, (iii) a Blowfish algorithm, (iv) a Twofish algorithm, (v) an Advanced Encryption Standard (AES) algorithm, (vi) a Diffie-Hellman algorithm, (vii) a Cramer-Shoup algorithm, and (viii) a ElGamal encryption algorithm. Additionally or alternatively the cryptographic algorithm 504 may be an equation that is unique, such as $(e^2)/(522*e)$, where "e" represents the character string. The result of applying the cryptographic algorithm 504 is a biometric key, which may be any suitable type of encryption key, such as a 512-bit key, a 768-bit key, a 1024-bit key, or a 2048-bit key.

The biometric key may be hashed via a hash function 506 based on various hash values by a computing device. The hash function 506 and the associated hash values may be specifically configured for cryptography. As shown in FIG. 5, the hash function 506 outputs a hashed biometric key. The complexity of the biometric hash may be further increased by adding salt 508, e.g., salt values, to the hashed key, which may be data associated with and unique to the user. For example, a salt value may be data or information related to where the user attended college, names of the user's mother and father, what street the user lived when the user was ten years old, a name of the user's current or past pet, etc. Adding salt to the biometric hash increases the overall complexity and security of the biometric data prior to storage. Thus, the output is a hashed and salted biometric key 510, which can be stored in one or more storage devices.

Once the hashed and salted biometric key is stored, any of the hash function, the hash values, and the salt values may be changed or "rolled" at a predetermined time interval, e.g., every minute, hour, six hours, 12, hours, 24 hours, week, a triggering event, etc. This ensures at least that the stored data is not static, thereby rendering the pre-rolled key unusable in accessing internal systems after the rolling process.

While the blocks in FIG. 5 are illustrated in a certain order, the process of generating the hashed and salted biometric key is not limited thereto. For example, the hashing and salting may be performed simultaneously. Alternatively, it may be understood that the salt values themselves can be used as the hash values in the hash function. In embodiments, the character string may be generated and automatically applied to the cryptographic algorithm simultaneously in real-time. Alternatively, the process of the generating the characters string may be separate, whereby it is created at a different time than the time of applying it to the cryptographic algorithm. For example, one computing device may generate the unique character string and a different computing device (connected to the computing device via a network) may receive the string to generate the biometric key using the cryptographic algorithm.

Figure 6:
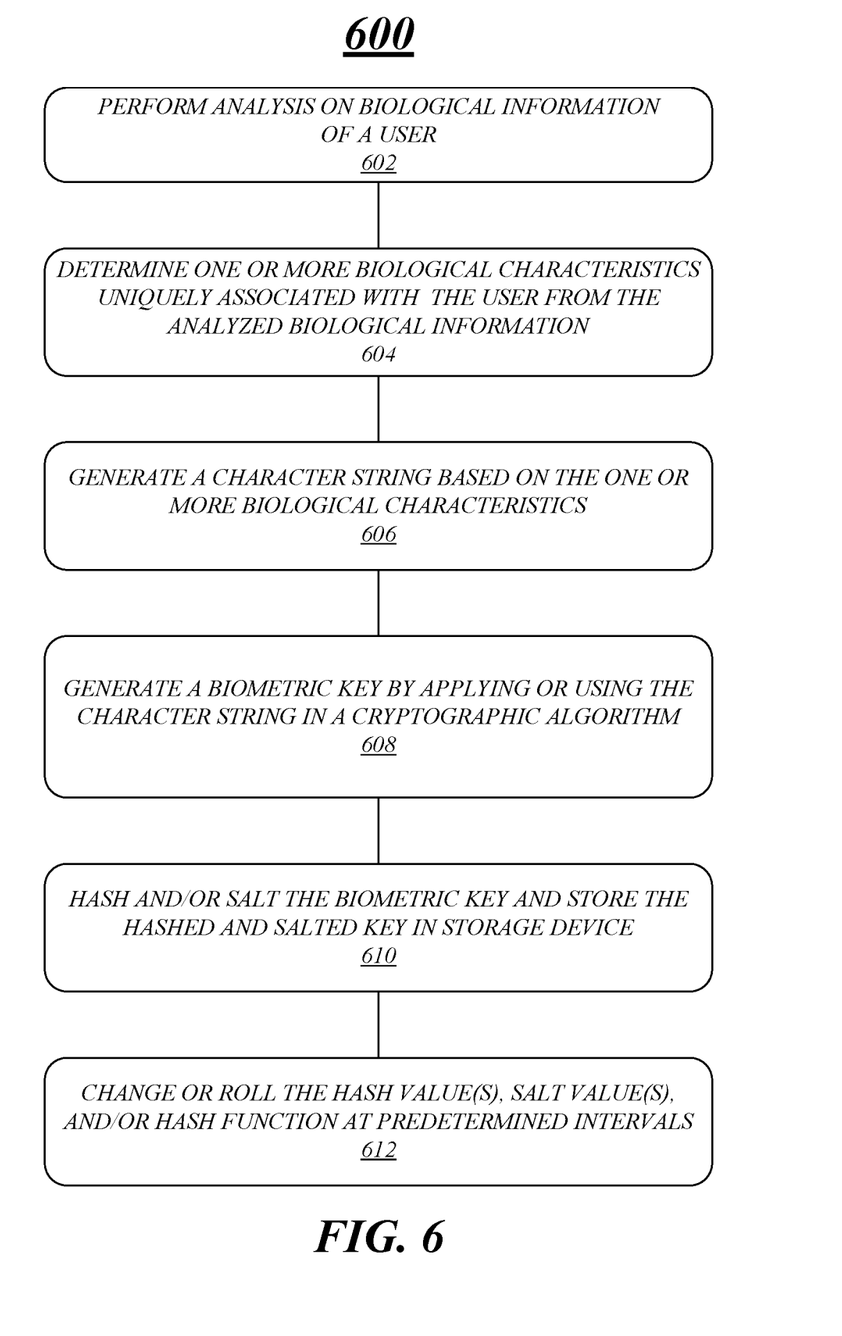
FIG. 6 illustrates an example flow diagram in accordance with one or more embodiments.

FIG. 6 illustrates a flow diagram 600 in accordance with one or more embodiments. It may be understood that the features associated with the illustrated blocks may be performed or executed by one or more computing devices and/or processing circuitry contained therein.

At block 602, biological information may be acquired or received from a user and analysis performed thereon. The biological information may be any information related to the unique anatomical or physiological characteristics of the user, such as a facial image, fingerprint, eye scan, voice recording, etc., as described above.

At block 604, based on the analysis, one or more biological characteristics may be determined. For example, a width measurement of the user's face, a height measurement of the face, a distance between the pupils of the eyes, a distance between a pupil and the user's lips, etc. At block 606, these unique biological characteristics may be used to generate a character string indicating such characteristics. The character string may include numerous alphanumeric characters and/or symbols can be chosen, applied, and/or arranged in a predetermined way. It may be based on a coding technique or system, as described above.

At block 608, the character string may be applied to or used in a cryptographic algorithm to generate a biometric key. At block 610, the biometric key may be hashed using a hash function and various hash values which may be cryptographic in nature and further salted with salt values that are unique to the user. The hashed and salted key is then stored in one or more storage devices.

At block 612, the hash values, hash function, and/or salt values may be changed at a predetermined time, interval, or when predetermined events or instances occur. As set forth above, this ensures that the hashed and salted keys—if compromised, stolen, or copied by an authorized person—cannot be used or replayed to access internal systems after a certain amount of time or after a certain event.

It may be understood that the blocks illustrated in FIG. 6 are not limited to any specific order. One or more of the blocks may be performed or executed simultaneously or near simultaneously. For example, the hashing and salting of the key may be performed at the same time.

Figure 7:
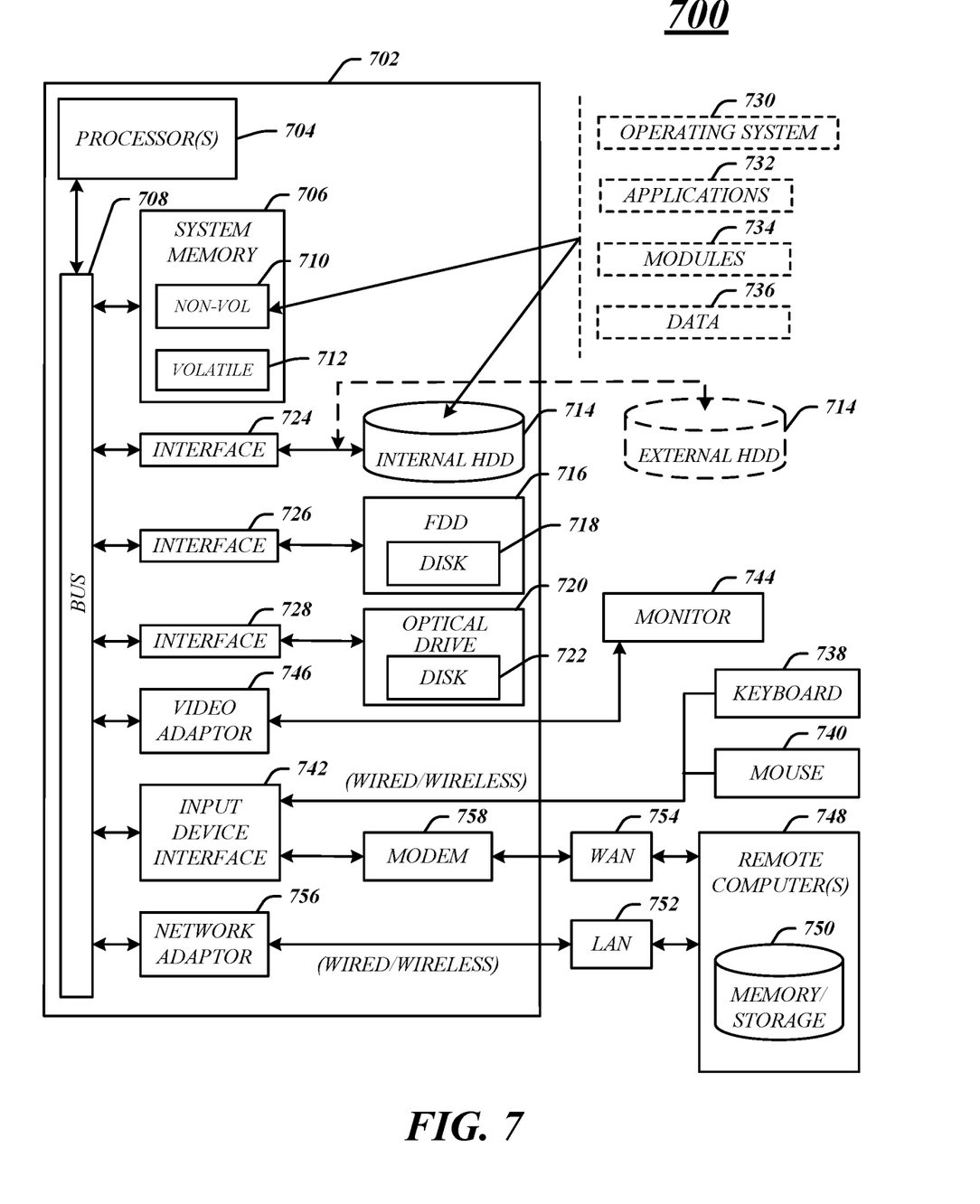
FIG. 7 illustrates an example computing architecture of a computing device in accordance with one or more embodiments.

FIG. 7 illustrates an embodiment of an exemplary computing architecture 700, e.g., of a computing device, such as a desktop computer, laptop, tablet computer, mobile computer, smartphone, etc., suitable for implementing various embodiments as previously described. In one embodiment, the computing architecture 700 may include or be implemented as part of a system, which will be further described below. As described above, at least one computing device and/or the processing circuitries thereof may be configured to at least perform analysis on biological information associated with a user, determine biological characteristic(s) of the user, generate a unique character string based on those characteristic(s), generate a biometric key via a cryptographic algorithm, the output of which may be hashed, salted, and stored in one or more storage devices, whereby the hash values, salt values, and/or hash function may be changed at various times.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes processor 704, a system memory 706 and a system bus 708. The processor 704 can be any of various commercially available processors, processing circuitry, central processing unit (CPU), a dedicated processor, field-programmable gate array (FPGA), etc.

The system bus 708 provides an interface for system components including, but not limited to, the system memory 706 to the processor 704. The system bus 708 can be any of several types of bus structure that may further interconnect to a memory bus (with or without a memory controller), a peripheral bus, and a local bus using any of a variety of commercially available bus architectures. Interface adapters may connect to the system bus 708 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 706 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media in the form of one or more lower speed memory units, including an internal (or external) hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. In one embodiment, the one or more application programs 732, other program modules 734, and program data 736 can include, for example, the various applications and/or components of the system 800.

A user can enter commands and information into the computer 702 through one or more wire/wireless input devices, for example, a keyboard 738 and a pointing device, such as a mouse 740. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 704 through an input device interface 742 that is coupled to the system bus 708 but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. The monitor 744 may be internal or external to the computer 702. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754 or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.118 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 8:
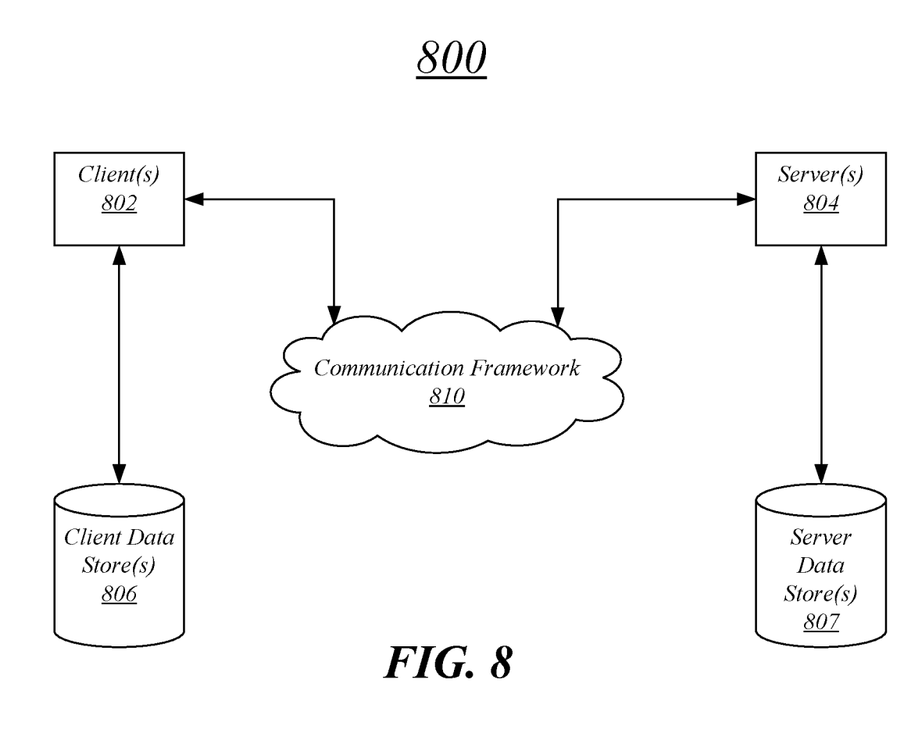
FIG. 8 illustrates an example communications architecture in accordance with one or more embodiments.

FIG. 8 is a block diagram depicting an exemplary communications architecture 800 suitable for implementing various embodiments. For example, one or more computing devices may communicate with each other via a communications framework, such as a network. At least one computing device connected to the network may be a client computing device, such as a desktop computer, laptop, tablet computer, smartphone, etc. The at least one computing device connected to the network may be a server computer, which may be implemented as a back-end server. In some embodiments, the client computing device may be configured to generate the character string that is unique to a user based on the user's biological information. The at least one back-end server computer, for instance, may receive the character string and generate a unique biometric key, where the hashed and salted key(s) may be stored in server data stores. This relates, for instance, to examples where the character string may be generated by a third-party (e.g., a party that does not control the back-end server computers).

The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The one or more clients 802 and the servers 804 are operatively connected to one or more respective client data stores 806 and server data stores 807 that can be employed to store information local to the respective clients 802 and servers 804, such as cookies and/or associated contextual information. By way of example, server data store 807 may store all hashed and salted biometric keys.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus comprising:
memory to store instructions; and
processing circuitry, coupled with the memory, operable to execute the instructions, that when executed, cause the processing circuitry to:
receive biological information corresponding to a user;
analyze the received biological information;
determine a plurality of biological characteristics uniquely associated with the user based on the analysis; and
generate a character string based at least in part on the plurality of biological characteristics, and
wherein the character string comprises a plurality of alphanumeric characters,
wherein each biological characteristic of the plurality of biological characteristics is represented by a respective substring of a plurality of substrings of the character string, a length of the plurality of substrings comprising two or more different substring lengths,
wherein the alphanumeric characters are space delimited and character delimited such that the space delimitation and the character delimitation uniquely relate to or identifies the user, and
wherein the character string is used for generating a biometric key associated with the user.

2. The apparatus of claim 1, wherein the biological information comprises: (i) a fingerprint, (ii) a face, (iii) a palm print, (iv) palm veins, (v) a hand geometry, (vi) a voice, (vii) an iris, (viii) a retina, and/or (ix) an eye scan, wherein a first substring of the plurality of substrings is of a first substring length, wherein a second substring of the plurality of substrings is of a second substring length, wherein the second substring length is different than the first substring length.

3. The apparatus of claim 1, wherein the biological information is received via at least one input device, and wherein the at least one input device is: (i) a camera, (ii) a microphone, (iii) a fingerprint reader, (iv) a palm print scanner or reader, (v) a palm vein scanner or reader, and/or (vii) an eye scanner.

4. The apparatus of claim 1, wherein the plurality of biological characteristics include: (i) a pupillary distance (PD), (ii) a monocular PD, (iii) a distance between, or distances among, an eye, a pupil, an ear, a nose, an upper lip, a lower lip, and/or a chin, (iv) a face width, (v) a face height, (vi) voice frequency, (vii) an arch, loop, and/or whorl of a fingerprint, (viii) a distance between at least two veins of a palm, (ix) a size of an iris, (x) a size of a pupil, and/or (xi) a distance between at least two veins of a retina.

5. The apparatus of claim 1, wherein the space delimitation and the character delimitation of the alphanumeric characters represent information associated with the at least one of the plurality of biological characteristics.

6. The apparatus of claim 1, wherein one or more of the plurality of substrings of the character string, vary in alphanumeric character type and vary in arrangement.

7. The apparatus of claim 1, wherein the processing circuitry is further caused to provide or send the generated character string to one or more remote computing devices for generating the biometric key, and wherein the biometric key is generated based on a cryptographic algorithm.

8. The apparatus of claim 1, wherein the biometric key is a 512-bit key, a 768-bit key, a 1024-bit key, or a 2048-bit key.

9. The apparatus of claim 7, wherein the cryptographic algorithm is: (i) a Triple Data Encryption Standard (DES) algorithm, (ii) a RSA public-key encryption algorithm, (iii) a Blowfish algorithm, (iv) a Twofish algorithm, (v) an Advanced Encryption Standard (AES) algorithm, (vi) a Diffie-Hellman algorithm, (vii) a Cramer-Shoup algorithm, and/or (viii) a ElGamal encryption algorithm.

10. The apparatus of claim 1, wherein at least one hash function is applied to the biometric key to generate a hashed biometric key, wherein salt is applied to the hashed biometric key to generate a salted and hashed biometric key, and wherein the salted and hashed biometric key is stored in one or more storage devices.

11. The apparatus of claim 10, wherein the at least one hash function is changed at a predetermined interval to rotate, update, or roll the biometric key.

12. A method comprising:
receiving biological information corresponding to a user;
analyzing, via one or more processors, the received biological information;
determining, via the one or more processors, a plurality of biological characteristics uniquely associated with the user based on the analysis; and
generating, via the one or more processors, a character string based at least in part on the plurality of biological characteristics, and
wherein the character string comprises a plurality of alphanumeric characters,
wherein each biological characteristic of the plurality of biological characteristics is represented by a respective substring of a plurality of substrings of the character string, a length of the plurality of substrings comprising two or more different substring lengths,
wherein the alphanumeric characters are space delimited and character delimited such that the space delimitation and the character delimitation uniquely relate to or identifies the user, and
wherein the character string is used for generating a biometric key associated with the user.

13. The method of claim 12, wherein the biological information comprises: (i) a fingerprint, (ii) a face, (iii) a palm print, (iv) palm veins, (v) a hand geometry, (vi) a voice, (vii) an iris, (viii) a retina, and/or (ix) an eye scan, wherein a first substring of the plurality of substrings is of a first substring length, wherein a second substring of the plurality of substrings is of a second substring length, wherein the second substring length is different than the first substring length.

14. The method of claim 12, wherein the plurality of biological characteristics include: (i) a pupillary distance (PD), (ii) a monocular PD, (iii) a distance between, or distances among, an eye, a pupil, an ear, a nose, an upper lip, a lower lip, and/or a chin, (iv) a face width, (v) a face height, (vi) voice frequency, (vii) an arch, loop, and/or whorl of a fingerprint, (viii) a distance between at least two veins of a palm, (ix) a size of an iris, (x) a size of a pupil, and/or (xi) a distance between at least two veins of a retina.

15. The method of claim 12, wherein the space delimitation and the character delimitation of the alphanumeric characters represent information associated with the at least one of the plurality of biological characteristics.

16. The method of claim 12, wherein one or more of the plurality of substrings of the character string, vary in alphanumeric character type and vary in arrangement.

17. A non-transitory computer-readable storage medium storing computer-readable program code executable by a processor to:
receive biological information corresponding to a user;
analyze the received biological information;
determine a plurality of biological characteristics uniquely associated with the user based on the analysis; and
generate a character string based at least in part on the plurality of biological characteristics, and
wherein the character string comprises a plurality of alphanumeric characters,
wherein each biological characteristic of the plurality of biological characteristics is represented by a respective substring of a plurality of substrings of the character string, a length of the plurality of substrings comprising two or more different substring lengths,
wherein the alphanumeric characters are space delimited and character delimited such that the space delimitation and the character delimitation uniquely relate to or identifies the user, and
wherein the character string is used for generating a biometric key associated with the user.

18. The non-transitory computer-readable storage medium of claim 17, wherein the biological information is received via at least one input device, and wherein the at least one input device is: (i) a camera, (ii) a microphone, (iii) a fingerprint reader, (iv) a palm print scanner or reader, (v) a palm vein scanner or reader, and/or (vii) an eye scanner, wherein a first sub string of the plurality of sub strings is of a first substring length, wherein a second substring of the plurality of substrings is of a second substring length, wherein the second substring length is different than the first substring length.

19. The non-transitory computer-readable storage medium of claim 17, wherein the space delimitation and the character delimitation of the alphanumeric characters represent information associated with the at least one of the plurality of biological characteristics.

20. The non-transitory computer-readable storage medium of claim 17, wherein one or more of the plurality of substrings of the character string, vary in alphanumeric character type and vary in arrangement.

* * * * *